Aug. 26, 1930.   A. E. VAN ARKEL   1,774,410
PROCESS OF PRECIPITATING BORON
Filed Aug. 18, 1926
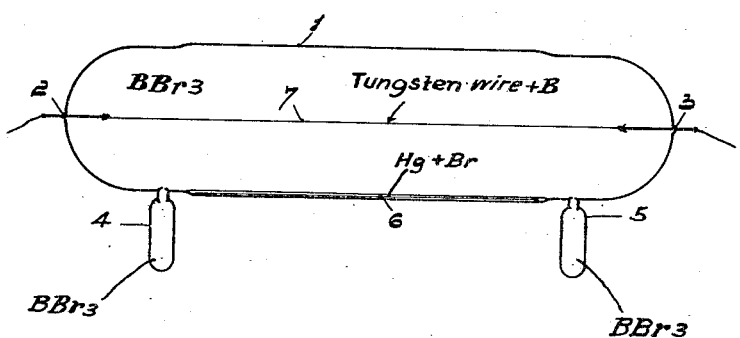
Inventor
A. E. van Arkel
By Langner, Parry, Card & Langner
Attys.

Patented Aug. 26, 1930

1,774,410

UNITED STATES PATENT OFFICE

ANTON EDUARD VAN ARKEL, OF EINDHOVEN, NETHERLANDS, ASSIGNOR TO N. V. PHILIPS GLOEILAMPENFABRIEKEN, OF EINDHOVEN, NETHERLANDS

PROCESS OF PRECIPITATING BORON

Application filed August 18, 1926, Serial No. 130,083, and in the Netherlands October 5, 1925.

The present invention is concerned with a process of precipitating boron and has for its object to precipitate boron in a coherent form. It has been proposed to precipitate boron from boron halid on an incandescent surface reducing the halid by means of a reducing gas, such as hydrogen. The present method of precipitating boron in a coherent form on a body having a sufficiently high melting point, consists in heating the body in an atmosphere of one or more of the halogenides of boron, without making use of any reducing agent. Preferably, said body should be heated in an atmosphere of boron bromide. Owing to the high temperature to which the core is heated the boron halide dissociates whereby boron deposits on the core in a coherent form and the halogen is liberated. According to the invention this halogen can be removed by introducing into the reaction vessel a substance which chemically binds the halogen. For this purpose mercury should preferably be used, in which case the halogen is bound as a mercury halide. In order to precipitate boron in accordance with this process, it suffices that the atmosphere exclusively consists of one or more halides of boron. Although the presence of some admixtures will not exercise any detrimental influence on the favourable course of the boron precipitation, there are admixtures which have an unfavourable influence on the course of the process and which even are able to prevent the precipitation of boron as such. Thus, for example, it has been found that a slight addition of nitrogen gives rise to the formation of boron nitride and that an addition of hydrogen causes the boron to precipitate in a non-coherent form.

The process will be elucidated by an example which will be described with reference to the drawing accompanying the present specification. In this drawing the numeral 1 refers to a glass vessel in which at 2 and 3 leading-in wires for an electric current are sealed. In this vessel a tungsten wire 7 is fixed to said two leading-in wires. To the bottom of the vessel 1 are sealed two small vessels 4 and 5 which are destined to contain boron halide. At 6 a quantity of mercury is disposed in the reaction vessel in order to bind the halogen produced by dissociation. In order to precipitate boron on the tungsten wire, the latter is heated by means of an electric current to a temperature of about 1400° C., the vessel 5 which when starting is empty is cooled for example with the aid of liquid air and the vessel 4 filled for example with boron bromide is maintained at room temperature. Now the boron bromide which at room temperature is sufficiently volatile, will evaporate and when touching the filament will be dissociated whereby boron precipitates on the wire and bromine is liberated. The bromine will be bound by the mercury present at 6. The boron bromide which has not been dissociated, is condensed in the vessel 5. Owing to the evaporation of the boron bromide in the vessel 4, the latter will be cooled to a temperature lying below room temperature. It is therefore advisable to heat the vessel 4 to such an extent that the boron bromide always remains at room temperature. When all the boron bromide of the vessel 4 has been evaporated, the heating device may be transferred from the vessel 4 to the vessel 5 in which a certain quantity of boron bromide has assembled whereupon the vessel 4 may be cooled with the aid of liquid air. This may be continued whilst interchanging each time the functions of the vessels 4 and 5. By this process the boron precipitates on the tungsten wire as a firmly coherent layer. It is obvious that the current which originally is sent through the tungsten wire, must be raised as the wire grows in size lest the temperature of the wire should fall during the reaction. It has been found that this does not cause any difficulties because the resistance of boron which at a low temperature is very high, is low at the reaction temperature.

Boron can be precipitated not only on tungsten but also on other materials and even on boron itself, which practically happens as soon as the core wire has been coated with a layer of boron. If it is desired to produce very thick boron wires or rods, it is advisable to carry out the process in several stages, for example in several reaction vessels and to choose each time the thickness of the leading-in wires with regard to the thickness of the boron wire. In order to cause a boron wire to glow, the latter must first be brought up to incandescence with the aid of a high tension. Thus, for example, a boron wire having a thickness of 1 mm. and a length of 5 cm., needs a tension of 3000 volts in order to arrive at incandescence. This tension should be decreased in proportion as the temperature of the wire increases and at 1000° C. the resistance is about one million times smaller that at room temperature.

Owing to its property of having a high resistance at a low temperature boron in a coherent form may be used as a resistance material. Boron in a coherent form further proves to be an excessively hard material which as regards hardness lies between corundum and diamond.

What I claim is:—

1. The process of precipitating boron in a coherent mass on a body having a high melting point, comprising, arranging a body which is chemically inert toward a halide of boron, in an atmosphere of at least one of the halides of boron, and raising the body to a temperature sufficiently elevated to cause disassociation of the halide of boron in the said atmosphere solely by heat, thereby causing the deposit of the boron on said body.

2. The process of precipitating boron in a coherent mass on a body having a high melting point, comprising, arranging a body which is chemically inert to boron bromide in an atmosphere of boron bromide, and raising the body to a temperature sufficiently elevated to cause disassociation of the boron bromide in said atmosphere solely by heat, thereby causing the deposit of the freed boron on said body.

3. The process of precipitating boron in a coherent mass on a body having a high melting point, comprising, arranging a body which is chemically inert toward a halide of boron, in an atmosphere of at least one of the halides of boron, raising the body to a temperature sufficiently elevated to cause disassociation of the halide of boron in the said atmosphere solely by heat, thereby causing the deposit of the boron on said body, and concurrently clearing the atmosphere of the bromide freed by the said disassociation.

4. The process of precipitating boron in a coherent mass on a body having a high melting point, comprising, arranging a body which is chemically inert toward a halide of boron, in an atmosphere of at least one of the halides of boron, raising the body to a temperature sufficiently elevated to cause disassociation of the halide of boron in the said atmosphere solely by heat, thereby causing the deposit of the boron on said body, and concurrently clearing the atmosphere of the bromide freed by the said disassociation by causing it to combine chemically with a suitable substance.

5. The process of precipitating boron in a coherent mass on a body having a high melting point, comprising, arranging a body which is chemically inert toward a halide of boron, in an atmosphere of at least one of the halides of boron, raising the body to a temperature sufficiently elevated to cause disassociation of the halide of boron in the said atmosphere solely by heat, thereby causing the deposit of the boron on said body, and concurrently clearing the atmosphere of the bromide freed by the said disassociation, by combining it chemically with mercury.

In testimony whereof I affix my signature, at the city of Eindhoven, this 4th day of August, A. D. 1926.

ANTON EDUARD VAN ARKEL.